(12) United States Patent
Sießegger

(10) Patent No.: US 7,671,545 B2
(45) Date of Patent: Mar. 2, 2010

(54) DEVICE AND METHOD FOR OPERATING A HIGH-PRESSURE DISCHARGE LAMP

(75) Inventor: Bernhard Sießegger, München (DE)

(73) Assignee: Patent-Treuhand-Gesellschaft fur electrische Gluhlampen mbH, Munich (DE)

( * ) Notice: Subject to any disclaimer, the term of this patent is extended or adjusted under 35 U.S.C. 154(b) by 184 days.

(21) Appl. No.: 11/887,174

(22) PCT Filed: Apr. 12, 2006

(86) PCT No.: PCT/EP2006/003389
§ 371 (c)(1),
(2), (4) Date: Sep. 26, 2007

(87) PCT Pub. No.: WO2006/108645
PCT Pub. Date: Oct. 19, 2006

(65) Prior Publication Data
US 2009/0058314 A1    Mar. 5, 2009

(30) Foreign Application Priority Data
Apr. 14, 2005  (EP) .................................. 05008228

(51) Int. Cl.
*H05B 37/02* (2006.01)
*H05B 41/14* (2006.01)
(52) U.S. Cl. ...................................... 315/330; 315/289
(58) Field of Classification Search ................ 315/261, 315/262, 263, 264, 209 T, 209 CD, 209 PZ
See application file for complete search history.

(56) References Cited

U.S. PATENT DOCUMENTS

| | | | |
|---|---|---|---|
| 4,358,712 A | 11/1982 | Filgas, Jr. et al. | |
| 4,501,994 A * | 2/1985 | Spreadbury | 315/307 |
| 5,051,660 A | 9/1991 | Domann et al. | |
| 5,233,273 A | 8/1993 | Waki et al. | |
| 5,886,481 A * | 3/1999 | Flory, IV | 315/290 |
| 5,990,633 A * | 11/1999 | Hirschmann et al. | 315/289 |
| 6,194,844 B1 * | 2/2001 | Rupp et al. | 315/289 |
| 6,590,350 B1 | 7/2003 | Tyson et al. | |
| 6,724,155 B1 * | 4/2004 | Flory et al. | 315/289 |

(Continued)

FOREIGN PATENT DOCUMENTS

DE    37 15 162 A1    11/1988

(Continued)

*Primary Examiner*—Douglas W Owens
*Assistant Examiner*—Minh D A
(74) *Attorney, Agent, or Firm*—Frishauf, Holtz, Goodman & Chick, P.C.

(57) ABSTRACT

The invention is a device for operating a high-pressure gas discharge lamp, which is provided with a starting auxiliary electrode, with a current of alternating polarity. The device has a series resonance circuit with a resonance inductive resistor, through which flows the lamp current when the lamp is in operation, and a starting device for subjecting the starting auxiliary electrode to the starting voltage required for starting the gas discharge in the high-pressure gas discharge lamp. There is also a capacitive component, which is connected in series to the resonance inductive resistor and is dimensioned in such a manner that the capacitive component effects, after the gas discharge in the high-pressure gas discharge lamp has been started, at least a partial compensation for the inductance of the resonance inductive resistor, through which the lamp current flows.

4 Claims, 2 Drawing Sheets

U.S. PATENT DOCUMENTS

Figure 1:
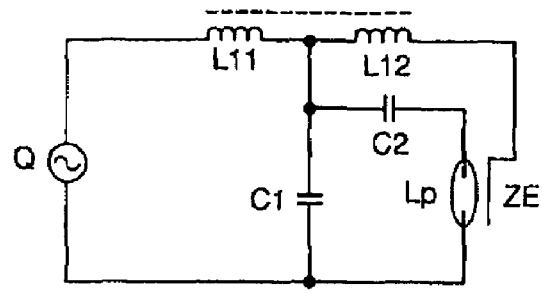

2003/0173912 A1* 9/2003 Huber et al. ................ 315/291

FOREIGN PATENT DOCUMENTS

| | | |
|---|---|---|
| DE | 199 16 878 A1 | 3/2000 |
| DE | 102 10 717 A1 | 10/2003 |
| EP | 0 477 621 A | 4/1992 |
| EP | 0 740 494 A2 | 10/1996 |
| GB | 2346273 A | 8/2000 |
| WO | WO 93/04569 A1 | 3/1993 |

\* cited by examiner

DEVICE AND METHOD FOR OPERATING A HIGH-PRESSURE DISCHARGE LAMP

This application is a U.S. National Phase Application under 35 USC 371 of International Application PCT/EP2006/003389, filed Apr. 12, 2006, which is incorporated herein in its entirety by this reference.

The invention relates to a device for operating a high-pressure discharge lamp which has been provided with an auxiliary ignition electrode and a method for operating such a high-pressure discharge lamp.

I. PRIOR ART

The as yet unpublished German patent application with the official file reference 10 2004 052299.5 describes a device for operating a high-pressure discharge lamp, which has been provided with an auxiliary ignition electrode, with a current of alternating polarity, the ignition voltage required for igniting the gas discharge in the high-pressure discharge lamp being produced by means of a series resonant circuit. The series resonant circuit comprises an autotransformer whose first winding section, which acts as the primary winding, forms the resonant inductance, through which the lamp current flows once the ignition phase of the high-pressure discharge lamp has come to an end, and whose second winding section, which acts as the secondary winding, supplies the auxiliary ignition electrode of the high-pressure discharge lamp during the ignition phase with the ignition voltage required for igniting the gas discharge in the high-pressure discharge lamp. During the abovementioned ignition phase, an alternating voltage or an alternating current is applied to the series resonant circuit, the frequency of said alternating voltage or alternating current being close to the resonant frequency of the series resonant circuit, so that an increased alternating voltage due to resonance is made available at the first winding section of the autotransformer and at the resonant capacitance of the series resonant circuit during the ignition phase, which increased alternating voltage is increased by means of the second winding section of the autotransformer corresponding to the ratio of the number of turns of the second and first winding section, so that the ignition voltage required for igniting the gas discharge is present at the auxiliary ignition electrode of the high-pressure discharge lamp. Once the gas discharge in the high-pressure discharge lamp has been ignited, the discharge path between the main electrodes of the high-pressure discharge lamp is conductive, so that the resonant capacitance of the series resonant circuit is virtually short-circuited via the conductive discharge plasma between the main electrodes of the high-pressure discharge lamp, and the lamp current flows through the first winding section of the autotransformer. In the case of a radiofrequency operation of the high-pressure discharge lamp, which is required in particular in the case of high-pressure discharge lamps for vehicle headlamps so as to avoid acoustic resonances in the discharge medium, the radiofrequency lamp current causes, in the first winding section of the autotransformer, which acts as the resonant inductance, a considerable voltage drop and therefore a high reactive power, which results in poor efficiency of the device.

Figure 3:
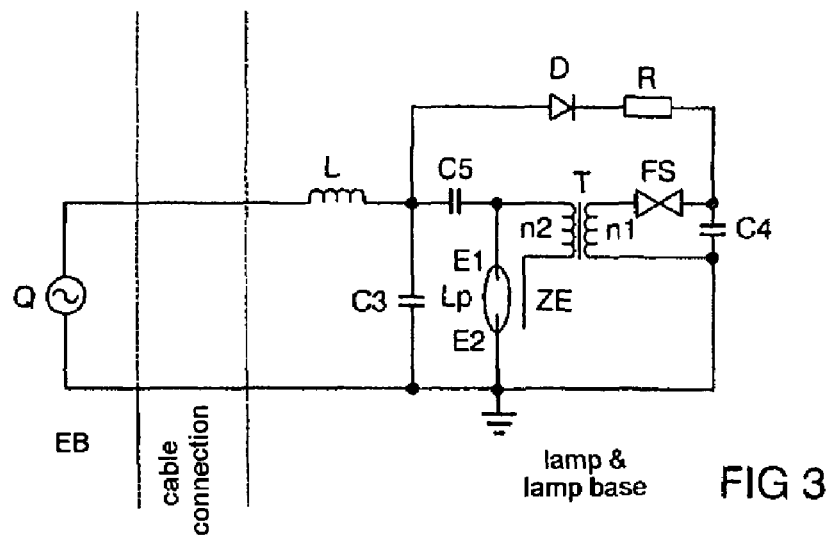
Figure 4:
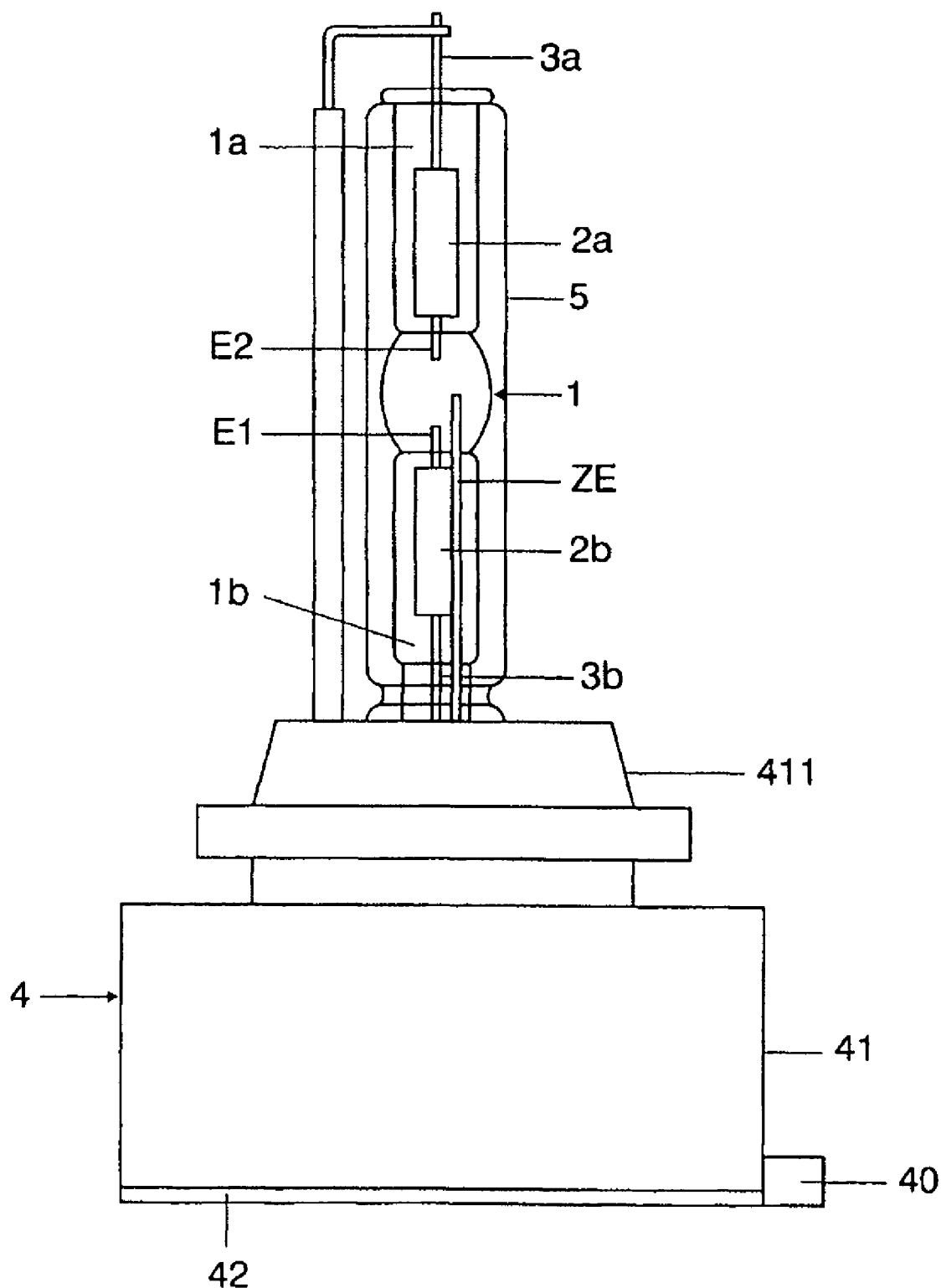

The device described in the as yet unpublished German patent application with the official file reference 10 2004 05600.2 has the same disadvantage in the embodiments shown in FIGS. 3 and 4. The device described in the last-mentioned patent application is likewise used for operating a high-pressure discharge lamp, which has been provided with an auxiliary ignition electrode, with a current of alternating polarity, but the ignition voltage required for igniting the gas discharge in the high-pressure discharge lamp, in contrast to the first-mentioned patent application, is produced by means of a pulse ignition device. The supply of the pulse ignition unit and a sufficiently high voltage between the two main electrodes of the high-pressure discharge lamp for the ignition of the high-pressure discharge lamp is made possible by means of a series resonant circuit in accordance with the embodiments described in FIGS. 3 and 4. The resonant inductance of this series resonant circuit in the case of operation of the lamp with a radiofrequency lamp current results in the same disadvantage as has already been explained above for the first-mentioned patent application.

II. DESCRIPTION OF THE INVENTION

The object of the invention is to avoid the above-mentioned disadvantages with a device of the generic type and to specify a corresponding operating method for a high-pressure discharge lamp in which these disadvantages are avoided.

The device according to the invention for operating a high-pressure discharge lamp, which has been provided with an auxiliary ignition electrode, with a current of alternating polarity comprises a series resonant circuit having a resonant inductance, through which the lamp current flows during lamp operation, and an ignition device for applying the ignition voltage required for igniting the gas discharge in the high-pressure discharge lamp to the auxiliary ignition electrode, a capacitive component part being provided, which is connected in series with the resonant inductance and is dimensioned such that the capacitive component part brings about at least partial compensation of the inductance of the resonant inductance, through which the lamp current flows, once the gas discharge in the high-pressure discharge lamp has been ignited. That is to say that the capacitance of the abovementioned capacitive component part is matched to the inductance value of the resonant inductance and to the frequency of the lamp current in such a way that the inductance of the resonant inductance through which the lamp current flows is at least partially compensated for by the capacitive component part. Corresponding to the degree of compensation, the reactive power caused by the lamp current in the resonant inductance and in the capacitive component part, which is connected in series therewith, is reduced and the efficiency of the device is increased.

Advantageously, the resonant frequency of the series resonant circuit is greater than 300 kHz, in particular greater than 600 kHz, in order to avoid excitation of acoustic resonances in the discharge medium of the high-pressure discharge lamp during lamp operation. For lamps as are used in general lighting, negative effects owing to acoustic resonances are no longer to be expected for frequencies of greater than 220 kHz at a rated power of 70 W or for frequencies of greater than 340 kHz at a rated power of 35 W, as is described by E. Statnic in the article "Zum Hochfrequenzbetrieb von Halogen-Metall-dampflampen kleiner Leistung" [radio-frequency operation of metal-halide lamps having a low power rating] in "Technisch wissenschaftliche Abhandlungen der OSRAM Gesellschaft" [Technical and scientific work by OSRAM Gesellschaft], volume 12, Springer-Verlag, Berlin, 1986 on pages 394 to 407. 300 kHz can therefore be regarded as the limit for a very large number of lamps. For high-pressure discharge lamps which are used in motor vehicles, so-called coiled-coil lamps, this limit is from 600 to 800 kHz, as has been determined using dedicated measurements.

The capacitance of the capacitive component part is advantageously in the range of from 12 pF to 470 pF, in order to firstly ensure sufficient compensation of the inductance of the resonant inductance in the case of a lamp current whose frequency is in the range of a few hundred kilohertz to a few megahertz, and secondly to avoid severe excessive compensation and therefore loading of the feeding alternating voltage source with inductive reactive power.

The high-pressure discharge lamps under consideration are alternating current lamps. A direct current flow through such lamps results in severe loading of the electrodes and, associated with this, a severely shortened life. Furthermore, a direct current may result in the various filling constituents being separated during operation of the high-pressure gas discharge lamp along the discharge vessel, which results in poor optical properties. Owing to the capacitive component part which, according to the invention, is connected in series with the lamp and which primarily has the object of compensating for the inductance of the resonant inductance, a direct current flow through the lamp is reliably prevented.

The device according to the invention advantageously comprises at least one voltage converter in order to make it possible to regulate the lamp current or the lamp power.

In accordance with the preferred exemplary embodiments of the invention, the ignition device is either in the form of a pulse ignition device or comprises an inductive component, which is coupled to the resonant inductance of the series resonant circuit in order to, in the first case, provide a sufficiently high voltage between the two main electrodes of the high-pressure discharge lamp for igniting the gas discharge via the auxiliary ignition electrode by means of the increased voltage due to resonance of the resonant inductance or, in the second case, in order to pass the increased voltage due to resonance of the resonant inductance, increased by the turns ratio of the inductive component and the resonant inductance, directly on to the auxiliary ignition electrode. In the first case, the increased voltage due to resonance of the resonant inductance can also be passed on as the supply voltage to the pulse ignition device. The method according to the invention for operating a high-pressure discharge lamp, which has been provided with an auxiliary ignition electrode, with a current of alternating polarity includes the operation of the high-pressure discharge lamp by means of a series resonant circuit, whose resonant inductance, once the gas discharge in the high-pressure discharge lamp has been ignited, has the lamp current flowing through it, and which, at least during the ignition phase of the high-pressure discharge lamp, provides an increased voltage due to resonance at the main electrodes of the high-pressure discharge lamp, once the gas discharge in the high-pressure discharge lamp has been ignited, the inductance of the resonant inductance, through which the lamp current flows, of the series resonant circuit being at least partially compensated for by means of a capacitive component part connected in series therewith. Owing to the at least partial compensation of the inductance of the resonant inductance through which the lamp current flows, the reactive power in the series circuit comprising the resonant inductance and the capacitive component part is reduced during lamp operation, and the efficiency is increased corresponding to the degree of compensation.

In order to achieve an efficiency which is as high as possible and to keep the complexity involved for electromagnetic shielding of the device and the high-pressure discharge lamp as low as possible, an alternating current is applied to the series resonant circuit for igniting the gas discharge in the high-pressure discharge lamp, the frequency of said alternating current being in a first frequency range which is close to the resonant frequency of the series resonant circuit, and, once the gas discharge in the high-pressure discharge lamp has been ignited, an alternating current is applied to the resonant inductance of the series resonant circuit and the high-pressure discharge lamp, the frequency of said alternating current being arranged in a second frequency range which is below the resonant frequency of the virtually undamped series resonant circuit which has been under consideration until now.

The second frequency range is preferably above 300 kHz, in particular above 600 kHz, in order to avoid the excitation of acoustic resonances in the discharge medium of the high-pressure discharge lamp during lamp operation.

The first frequency range preferably extends to frequencies which are above the resonant frequency of the series resonant circuit and preferably also includes the resonant frequency of the series resonant circuit. This ensures that, when the frequency of the alternating current or the alternating voltage is reduced during the ignition phase and the subsequent lamp operation, the resonant frequency of the series resonant circuit is met with sufficient accuracy in order to ensure a sufficient magnification factor of the voltage at the resonant inductance and the resonant capacitance of the series resonant circuit. Once the lamp has been ignited, the series resonant circuit is severely damped, so that it is ensured that injection of further ignition voltage pulses via the auxiliary ignition electrode during lamp operation once the ignition phase has come to an end is suppressed.

The device according to the invention is preferably an electronic ballast for a high-pressure discharge lamp, in particular for a metal-halide high-pressure discharge lamp, which is used as the light source in a vehicle headlamp. At least a few components of this device, in particular the high-voltage-carrying components of the ignition device, are preferably accommodated in the lamp base of the high-pressure discharge lamp. As a result, the electrical terminals of the high-pressure discharge lamp which are passed out of the lamp base do not need to be designed to be resistant to high voltages. In order to produce the alternating voltage required for operating the series resonant circuit and the high-pressure discharge lamp, a single-stage voltage converter is advantageously used which generates this alternating voltage directly from the on-board system voltage of the vehicle. The single-stage voltage converter comprises only a few components, which can be accommodated in the lamp base.

III. DESCRIPTION OF THE PREFERRED EXEMPLARY EMBODIMENTS

Figure 2:
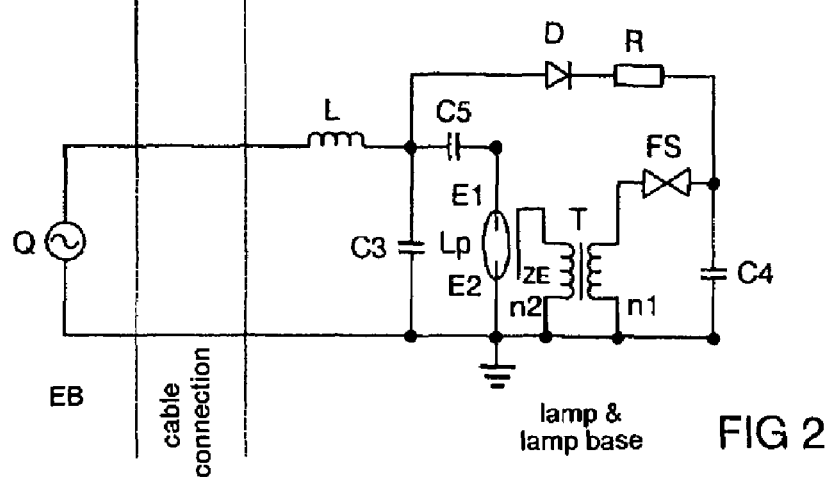

The invention will be explained in more detail below with reference to two preferred exemplary embodiments. In the drawing:

FIG. 1 shows the circuit arrangement in accordance with the first, second and third exemplary embodiment of the device according to the invention, FIG. 2 shows the circuit arrangement in accordance with the fourth and sixth exemplary embodiment of the device according to the invention, FIG. 3 shows the circuit arrangement in accordance with the fifth and seventh exemplary embodiment of the device according to the invention, and FIG. 4 shows a schematic illustration of a high-pressure discharge lamp for a vehicle headlamp.

The high-pressure discharge lamp Lp, which is illustrated schematically in FIG. 4 and is operated with the aid of the device in accordance with the preferred exemplary embodiments, is a metal-halide high-pressure discharge lamp for a motor vehicle headlamp. This high-pressure discharge lamp Lp has a discharge vessel 1 consisting of quartz glass, in which an ionizable filling is enclosed in a gas-tight manner. The ionizable filling contains xenon and metal halide compounds, preferably iodides of the metals sodium, scandium, zinc and indium, and the ionizable filling preferably does not contain any mercury. The xenon coldfilling pressure is approximately 10 bar. The two ends 1a, 1b of the discharge vessel 1 are each sealed off by means of a molybdenum foil fuse seal 2a, 2b. Located in the interior of the discharge vessel 1 are two electrodes E1, E2, between which the discharge arc responsible for the light emission is formed during lamp operation. These main electrodes E1, E2 are each electrically conductively connected to a power supply line 3a, 3b, which is passed out of the discharge vessel 1, via one of the molybdenum foil fuse seals 2a, 2b. The discharge vessel 1 is enveloped by a vitreous outer bulb 5. In this exemplary embodiment of the invention, the auxiliary ignition electrode ZE is in this case formed by a thin metallic coating on the inner surface of the outer bulb 5. Alternatively, this coating can also be applied to the outside of the discharge vessel 1 or to the outside of the outer bulb 5, however. The thin metallic coating ZE has the form of an elongated strip, which extends from that end of the outer bulb 5 which is near to the base approximately as far as the height of the central point of the discharge vessel. The lamp vessels 1, 5 are fixed in the upper part 411, which consists of plastic, of a lamp base 4. The parallelepipedal part of the lamp base 4 is surrounded by a two-part metallic housing 41, 42, which serves the purpose of electromagnetically shielding the pulse ignition device accommodated in the interior of the lamp base 4. The electrical terminal 40 of the high-pressure discharge lamp Lp is used for supplying voltage to the high-pressure discharge lamp and the pulse ignition device arranged in the lamp base 4. The electrical terminal 40 is connected to the operating device EB (not depicted) for the high-pressure discharge lamp via a shielded connecting cable (not depicted). The shielding braiding of the connecting cable is connected to the circuit-internal ground potential of the operating device and, via a contact of the electrical terminal 40, to the metal housing 41, 42, so that the metal housing 41, 42 is likewise at ground potential. In a further embodiment of the high-pressure discharge lamp Lp shown in FIG. 4, the voltage converter together with the device according to the invention for operating the high-pressure discharge lamp are accommodated in the metal housing 41, 42 and the on-board system voltage of the motor vehicle is supplied via the electrical terminal 40. This embodiment is particularly advantageous, in particular in the case of a single-stage voltage converter, owing to its low number of components.

The first exemplary embodiment of the device according to the invention illustrated schematically in FIG. 1 comprises an autotransformer L11, L12 and a capacitor C1. The autotransformer has a winding having a first winding section L11, which is in the form of the primary winding, and having a second winding section L12, which is in the form of the secondary winding of the transformer. The capacitor C1 and the primary winding section L11 are connected as a series resonant circuit, which is connected to the alternating voltage source Q. The resonant frequency of the series resonant circuit is preferably selected to be above 800 kHz, in particular above 1 MHz, which results in a small physical size and a particularly low required voltage at the auxiliary ignition electrode. The frequency of the supply voltage or the supply current is selected to be close to the resonant frequency of the series resonant circuit during the ignition phase or is selected to be such that a harmonic of the supply signal results in excitation of the series resonant circuit during the ignition phase.

The center tap between the two winding sections L11, L12, which is in the form of a common first terminal of the winding sections L11, L12, is connected both to the first terminal of the capacitor C2 and to the first terminal of the capacitor C1. The second terminal of the primary winding section L11 is connected to the alternating voltage source Q, while the second terminal of the secondary winding section L12 is connected to the auxiliary ignition electrode ZE of the high-pressure discharge lamp Lp. The second terminal of the capacitor C1 is connected to the alternating voltage source Q and the second electrode E2 of the high-pressure discharge lamp Lp. The second terminal of the capacitor C2 is connected to the first electrode E1 of the high-pressure discharge lamp Lp. The capacitor C1 is connected in parallel with the series circuit comprising the capacitor C2 and the discharge path of the lamp Lp. The lamp Lp is, for example, a mercury-free metal-halide high-pressure discharge lamp having a rated power of 35 W and a rated voltage of 42 V, which is provided as the light source in a vehicle headlamp. The discharge vessel of this high-pressure discharge lamp Lp either consists of a transparent ceramic, for example of high-alumina ceramic, or of quartz glass. The resonant capacitor C1 has a capacitance of 94 pF (measured at a frequency of 1 kHz and a low amplitude). The primary winding section L11 has 70 turns and an inductance of 100 µH (measured at a frequency of 1 kHz and a low amplitude). The secondary winding section L12 has 95 turns. The capacitor C2 has a capacitance of 270 pF (measured at a frequency of 1 kHz and a low amplitude).

In order to operate the abovementioned high-pressure discharge lamp Lp with a discharge vessel consisting of quartz glass, an alternating voltage source Q is used which has a virtually sinusoidal alternating voltage with an rms value of 195 V and a frequency of 1234 MHz. In order to ignite the gas discharge in the high-pressure discharge lamp Lp, the frequency of the alternating voltage provided by the alternating voltage source Q is matched to the resonant frequency of the series resonant circuit C1, L11, so that an increased alternating voltage due to resonance with a peak value of 1500 volts is built up at the component parts C1 and L11. This voltage is also present at the discharge path between the two electrodes of the high-pressure gas discharge lamp Lp, since the resonant capacitor C1 is connected in parallel with the discharge path of the lamp Lp. An alternating voltage with a peak value of 4000 volts is supplied to the auxiliary ignition electrode ZE by means of the secondary winding section L12. There is therefore a voltage difference between the auxiliary ignition electrode ZE and the electrode of the high-pressure discharge lamp Lp which is connected to the alternating voltage source Q and a terminal of the resonant capacitor C1 of 4000 volts, which, together with the voltage difference between the electrodes, is sufficient for igniting the gas discharge in the lamp Lp. Once the gas discharge in the high-pressure discharge lamp Lp has been ignited, the ignition device is deactivated automatically since the high-pressure discharge lamp then severely damps the resonant circuit. The frequency of the alternating voltage generated by the alternating voltage source Q is set after the ignition in such a way that the desired lamp power or the desired lamp current is set. During operation of the high-pressure discharge lamp Lp the primary winding section L11 is used for stabilizing the discharge, i.e. for limiting the lamp current. The capacitor C2 brings about partial compensation of the inductance of the primary winding section L11, through which the lamp current flows once the ignition phase has come to an end. The frequency of the alternating voltage source Q therefore needs to be set to approximately 710 kHz if said alternating voltage source provides a virtually sinusoidal alternating voltage with an rms value of 128 V in order to ensure operation of the high-pressure gas discharge lamp at the rated power once the metal halides have evaporated.

In order to ensure that the frequency of the alternating voltage generated by the alternating voltage source is sufficiently close to the resonant frequency of the series resonant circuit, which has a very narrow band owing to its high magnification factor, during the ignition phase, a frequency modulation of the alternating voltage can be carried out during the ignition phase. For this purpose, a frequency deviation of 50 kHz and a sinusoidal modulation signal at 500 Hz are suitable, for example, at a mid-frequency of 1230 MHz.

The second exemplary embodiment likewise has the construction illustrated in FIG. 1 and uses the high-pressure discharge lamp already described, but which is ignited at a frequency of approximately 21.6 MHz and is then operated at a frequency of approximately 13.6 MHz. The elements L11, C1 and C2 in this case have values of 7.8 µH, 7 pF and 12 pF. The third exemplary embodiment likewise has the construction illustrated in FIG. 1. A mercury-containing lamp having a rated power of 70 W and a rated voltage of 85 V is used as the high-pressure discharge lamp. The frequency of the alternating voltage source Q is approximately 308 kHz, both on ignition and during subsequent operation of the lamp. However, the voltage is not sinusoidal and therefore the ignition of the lamp takes place by means of the third harmonic contained in the voltage signal of the alternating voltage source Q, whereas the lamp current is virtually sinusoidal during subsequent operation and has a frequency of 308 kHz. The alternating voltage source Q is formed by a half-bridge circuit, so that the capacitor C2, in addition to partial compensation of the inductance of the primary winding section L11, through which the lamp current flows once the ignition phase has come to an end, also brings about suppression of a direct current flow through the lamp. The elements L11, C1 and C2 in this case have values of 670 µH, 45 pF and 470 pF.

FIG. 2 schematically illustrates the fourth embodiment of the device according to the invention for operating the high-pressure discharge lamp Lp including the component parts D, R, FS, C4, T, which are accommodated in the lamp base 4, of the pulse ignition device and a series resonant circuit L, C3. The component parts L, C3 of the series resonant circuit are likewise accommodated in the lamp base 4. The resonant capacitance C3 is connected in parallel with the series circuit comprising the capacitor C5 and the discharge path of the high-pressure discharge lamp Lp. A first terminal of the secondary winding n2 of the ignition transformer T is connected to the circuit-internal ground reference potential. The second terminal of the secondary winding n2 of the ignition transformer T is connected to the auxiliary ignition electrode ZE. During the ignition phase of the high-pressure discharge lamp Lp, the series resonant circuit L, C3 is operated at resonance so that an increased alternating voltage due to resonance is provided at the resonant capacitance C3 and therefore also via the discharge path of the high-pressure discharge lamp Lp and at the voltage input of the pulse ignition device, which increased alternating voltage due to resonance has a higher amplitude (by a factor of 2 to 10) than the alternating voltage generated by the alternating voltage source Q. High voltage pulses for the auxiliary ignition electrode ZE with voltages in the range of from approximately 5 kV to 30 kV are produced from this with the aid of the component parts D, R, FS, C4, T of the pulse ignition device. Suitable dimensioning of the electrical component parts of the pulse ignition device and of the series resonant circuit for producing an ignition voltage of approximately 30 kV or an ignition voltage of approximately 7 kV is disclosed in tables 1 and 2 respectively. The operating device EB is a voltage converter Q, which generates a virtually sinusoidal alternating voltage with an amplitude of from approximately 100 V to 500 V and a frequency of approximately 2.7 MHz during the ignition phase of the high-pressure discharge lamp and a frequency of approximately 1.8 MHz once the ignition phase has come to an end from the on-board voltage of the motor vehicle. The capacitor C5 brings about partial compensation of the inductance of the resonant inductance L, through which the lamp current flows once the ignition phase of the high-pressure discharge lamp Lp has come to an end. The high-pressure discharge lamp Lp corresponds in terms of its electrical data to the high-pressure discharge lamp already described in exemplary embodiment 1.

The fifth exemplary embodiment of the invention illustrated schematically in FIG. 3 differs from the fourth exemplary embodiment depicted in FIG. 2 merely by virtue of the fact that the first terminal of the secondary winding n2 of the ignition transformer T is connected to the electrode E1, which is at a high electrical potential, and not to the circuit-internal ground reference potential. In all other details the exemplary embodiments illustrated in FIGS. 2 and 3 correspond to one another. Identical component parts in these figures have therefore been provided with the same reference symbols.

Once the gas discharge in the discharge vessel 1 of the high-pressure discharge lamp Lp has been ignited, the now conductive discharge path between the two electrodes E1, E2 forms a shunt to the resonant capacitance C3 and the voltage input of the pulse ignition device, so that the voltage across the discharge path and therefore also at the voltage input of the pulse ignition device assumes considerably lower values. As result, the breakdown voltage of the spark gap FS at the ignition capacitor C4 is no longer achieved and the pulse ignition device does not generate any further ignition pulses for the high-pressure discharge lamp Lp. The pulse ignition device is therefore disconnected without any further complexity in terms of components. The capacitor C5 brings about partial compensation of the inductance of the resonant inductance L, though which the lamp current flows once the ignition phase of the high-pressure discharge lamp Lp has come to an end. In order to supply the high-pressure discharge lamp Lp and the pulse ignition device accommodated in the lamp base 4 with voltage, a two-conductor connection between the operating device EB and the terminal 40 of the high-pressure discharge lamp Lp is sufficient, since the pulse ignition device is supplied directly from the alternating voltage applied at the high-pressure discharge lamp Lp.

The fifth exemplary embodiment has the construction illustrated in FIG. 2. A mercury-containing lamp with a rated power of 35 W and a rated voltage of 85 V, as are used in motor vehicles, is used as the high-pressure discharge lamp. The frequency of the alternating voltage source Q is approximately 6.38 MHz on ignition and, during subsequent operation of the lamp, is approximately 3.1 MHz. The elements L, C3 and C5 in this case have values of 30 µH, 21 pF and 105 pF. During rated operation, i.e. once the evaporation of the metal halides during startup has come to an end, the alternating voltage source Q produces a virtually sinusoidal alternating voltage with an rms value of 117 V and therefore makes operation of the high-pressure gas discharge lamp with rated power possible.

The seventh exemplary embodiment of the invention illustrated schematically in FIG. 3 differs from the sixth exemplary embodiment merely by virtue of the fact that the first terminal of the secondary winding n2 of the ignition transformer T is connected to the electrode E1, which is at a high electrical potential, and not to the circuit-internal ground reference potential. In all other details exemplary embodiments 6 and 7 correspond to one another.

The exemplary embodiment shown in FIG. 1 can be supplemented by a direct voltage isolating capacitor in series with the ignition electrode, as has been described in the as yet unpublished German patent application with the official file reference 10 2004 052299.5 in the exemplary embodiment corresponding to FIG. 4, in this case denoted by C42. The exemplary embodiments shown in FIGS. 2 and 3 can be supplemented by a direct voltage isolating capacitor in series with the ignition electrode, as has been described in the as yet unpublished German patent application with the official file reference 10 2004 05600.2 in the exemplary embodiment corresponding to FIG. 6, in this case denoted by C0.

TABLE 1

Dimensioning of the electrical component parts depicted in FIGS. 2 and 3 for producing an ignition voltage of approximately 30 kV

| C3 | 120 pF |
| C4 | 10 nF |
| C5 | 270 pF |
| D | silicon carbide diodes in series |
| FS | 2000 V |
| L | 30 µH |
| R | 33 kohms |
| T | n1 = 2 turns, n2 = 40 turns |

TABLE 2

Dimensioning of the electrical component parts depicted in FIGS. 2 and 3 for producing an ignition voltage of approximately 7 kV

| C3 | 120 pF |
| C4 | 33 nF |
| C5 | 270 pF |
| D | silicon carbide diodes in series |
| FS | 800 V |
| L | 30 µH |
| R | 10 kohms |
| T | n1 = 3 turns, n2 = 29 turns |

The invention claimed is:

1. A method for operating a high-pressure discharge lamp (Lp), which has been provided with an auxiliary ignition electrode (ZE), with a current of alternating polarity, an increased voltage due to resonance being provided at main electrodes (E1, E2) of the high-pressure discharge lamp (Lp) by a series resonant circuit (L11, C1; L, C3), whose resonant inductance (L11; L), once the gas discharge in the high-pressure discharge lamp (Lp) has been ignited, has the lamp current flowing through it, during the ignition phase of the high-pressure discharge lamp (Lp), characterized in that, once the gas discharge in the high-pressure discharge lamp (Lp) has been ignited, the inductance of the resonant inductance (L11; L), through which the lamp current flows, of the series resonant circuit (L11, C1; L, C3) is at least partially compensated by a capacitive component part, which is connected in series therewith and wherein an alternating current being applied to the series resonant circuit (L11, C1; L, C3) for igniting the gas discharge in the high-pressure discharge lamp (Lp), the frequency of said alternating current being in a first frequency range which is close to the resonant frequency of the series resonant circuit (L11, C1; L, C3), and, once the gas discharge in the high-pressure discharge lamp (Lp) has been ignited, the alternating current is applied to the resonant inductance (L11; L) of the series resonant circuit (L11, C1; L, C3) and the high-pressure discharge lamp (Lp), the frequency of said alternating current being arranged in a second frequency range which is below the resonant frequency of the virtually undamped series resonant circuit (L11, C1; L, C3).

2. The method as claimed in claim 1, the second frequency range being above the acoustic resonances of the high-pressure discharge lamp (Lp) or above 300 kHz.

3. The method as claimed in claim 1, the first frequency range extending to frequencies above the resonant frequency of the series resonant circuit (L11, C1; L, C3).

4. The method as claimed in claim 1, the frequency of the current provided by the voltage converter (Q) during ignition of the high-pressure discharge lamp (Lp) being greater than the frequency of the current provided after ignition of the high-pressure discharge lamp (Lp).

\* \* \* \* \*